United States Patent

[11] 3,582,232

| [72] | Inventor | Ulo Okapuu<br>St. Lambert, Quebec, Canada |
|---|---|---|
| [21] | Appl. No. | 829,508 |
| [22] | Filed | June 2, 1969 |
| [45] | Patented | June 1, 1971 |
| [73] | Assignee | United Aircraft of Canada Limited<br>Lonqueuil, Quebec, Canada |

[54] RADIAL TURBINE ROTOR
4 Claims, 2 Drawing Figs.

[52] U.S. Cl. ................................................ 416/90,
 416/97, 416/188
[51] Int. Cl. ................................................ F01d 5/08
[50] Field of Search ........................................ 416/90,
 95—97, 181, 188; 415/115

[56] References Cited
UNITED STATES PATENTS
2,407,531  9/1946  Birmann ...................... 416/95(X)

| 2,823,008 | 2/1958 | Grey ........................... | 416/90 |
| 2,848,190 | 8/1958 | Barr ............................ | 416/97(X) |
| 2,873,945 | 2/1959 | Kuhn ........................... | 415/115 |
| 3,423,069 | 1/1969 | Chandley ..................... | 416/92 |

FOREIGN PATENTS
1,059,245  6/1959  Germany ..................... 416/96

*Primary Examiner*—Everette A. Powell, Jr.
*Attorney*—Alan Swabey

ABSTRACT: A turbine rotor having radially extending blades, each provided with an internal passage through which cooling air may pass, with the passages opening on to the convex, low pressure surfaces of the blades of the rotor.

The invention herein described was made in the course of or under a contract or subcontract thereunder (or grant) with the United States Department of the Army.

PATENTED JUN 1 1971  3,582,232

INVENTOR
Ulo OKAPUU

Alan Swabey
ATTORNEY

RADIAL TURBINE ROTOR

BACKGROUND OF INVENTION

1. Field of Invention

The present invention relates to a turbine. More specifically, the present invention relates to a turbine wherein cooling fluid functions both to cool the blade and to reduce the formation of a stagnant layer on the convex surface of the blade.

2. Description of Prior Art

The operation of high velocity gas radial turbines wherein hot gas contacts with the drive rotor blades is well known. In many cases, it is desirable to increase the temperature of the gases, thereby increasing the potential output of the turbine. Care must be taken to ensure that the rotor blades do not overheat, and for this reason, it would be advantageous to cool the rotor.

Recently, systems have been provided to prevent the formation of a stagnant border zone on the convex surface of the turbine blade, thereby to increase the efficiency of the turbine.

SUMMARY OF INVENTION

The present invention provides a turbine having cooling fluid passages which discharge fluid along the convex surface of the rotor blade whereby the blade may be cooled and also the tendency for the formation of a boundary layer on said convex surface may be reduced.

Broadly, the present invention relates to a rotor blade having a concave and a convex surface, a passage through said blade, said passage extending substantially axially and radially of said rotor and an outlet from said passage, said outlet opening through said convex surface whereby fluid may be passed through said passage to cool said blade and be discharged through said opening to reduce the tendency for the formation of a boundary layer of fluid along said convex surface.

BRIEF DESCRIPTION OF DRAWINGS

Further features, objects and advantages of the present invention will be evident from the following detailed description of a preferred embodiment of the present invention taken in conjunction with the accompanying drawings in which.

DESCRIPTION OF PREFERRED EMBODIMENT

Figure 1:
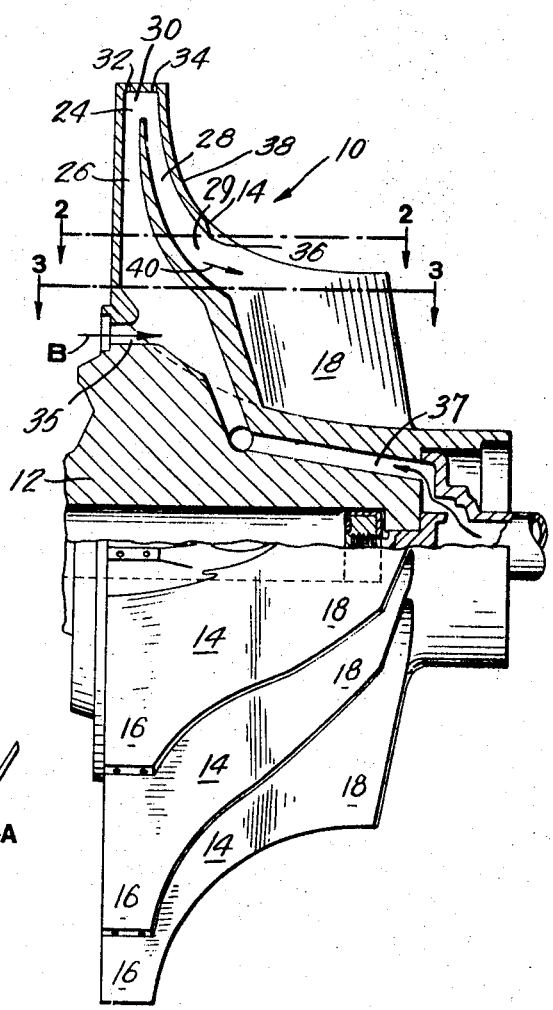
FIG. 1 is a partial axial section of a turbine rotor incorporating the present invention.
Figure 2:
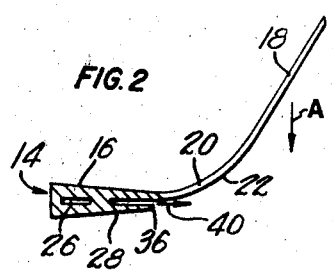
FIG. 2 is a section along the line 2–2 of FIG. 1.
Figure 3:
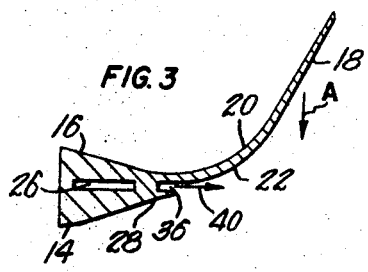
FIG. 3 is a section along the line 3–3 of FIG. 1.

The rotor is of cast one piece construction basically including a hub 12 with a plurality of rotor blades 14 projecting radially therefrom.

Each blade 14 has a star section 16 and an exducer section 18. Each blade has its star section 16 extending substantially axially of the rotor and is curved primarily in the exducer section 18 to form a concave, high pressure surface 20 on the high pressure side of the blade and a convex surface 22 on the low pressure side.

The blades 14 primarily in the star blade section 16 are provided with a bifurcated radial passage 24 having an inlet leg 26 and an outlet leg 28, each of which have been shown as being substantially rectangular in cross section. The leg 26 extends substantially radially through the blade 14 toward the rotor inlet edge or tip 30 where it meets leg 28 which extends radially inward and curves into an axial section 29. A pair of apertures 32 and 34 are provided, opening from the edges of passage 24 out through the tip 30 of the blade. These openings 32 and 34 ensure better flow of the cooling air through the passage 24.

The leg 26 is connected by a conduit 35 and/or 37 extending through the hub 12 to a suitable source of cooling fluid entering the conduit 35 as indicated by arrow B. The outlet leg 28 exhausts through outlet 36 formed through the convex surface 22 in the outer radial regions thereof i.e. adjacent the shroud edge 38 of the blade 14 and in or adjacent the exducer section 18. The passage 24, including the two legs 26 and 28, is substantially symmetrical to an axial plane passing through the center line of the star section 16 whereby the centrifugal bending stresses in the section 16 are minimized. These rotors are produced by investment casting, and therefore, the accuracy of the passage 24 varies accordingly. This location of the passage 24, together with the curvature of the blade 14, determines the specific shape and location of the outlet 36.

In operation, a compressible fluid, normally cooling air, is introduced through conduits 35 and/or 37 into the inlet leg 26 of the passage 24, travels up through this leg 26 to the tip 30, then travels along the outlet leg 28 and is exhausted as a jet of air indicated at 40 through the outlet 36. The air, in passing through the passage 24, tends to cool the blade 14 and the jet 40 passing over the convex leading surface 22 of the blade 14 and tends to reduce the formation of a boundary layer along this surface.

Modifications may be made without departing from the spirit of the invention as defined in the appended claims.

I claim:

1. A turbine rotor comprising a hub, a plurality of blades projecting substantially radially from said hub, each said blade having a star section and an exducer section and being curved to provide a concave and a convex surface, a confined passage extending through said star section, said passage extending substantially axially and radially of said rotor, an outlet from said passage, said outlet opening through said convex surface whereby a fluid jet may be issued through said outlet, thereby tending to reduce the formation of a boundary layer on said convex surface.

2. A device, as defined in claim 1, wherein said passage is substantially symmetrical with respect to the axial plane passing through the center line of the blade in said star section.

3. A device, as defined in claim 1, wherein said passage is formed by a pair of legs which meet adjacent the tip of said blade in said star section, one of said legs being connected with said opening and the other of said legs adapted to be connected to a source of cooling fluid.

4. A device as defined in claim 2, wherein said passage is formed by a pair of legs which meet adjacent the tip of said blade in said star section, one of said legs being connected with said opening and the other of said legs adapted to be connected to a source of cooling fluid.